Jan. 26, 1965 R. H. LAPP 3,166,949
HARMONIC DRIVE ADJUSTING MEANS
Filed April 9, 1964

INVENTOR.
ROGER H. LAPP
BY
Claude Funkhouser
ATTORNEY

United States Patent Office 3,166,949
Patented Jan. 26, 1965

3,166,949
HARMONIC DRIVE ADJUSTING MEANS
Roger H. Lapp, Silver Spring, Md., assignor to the United States of America as represented by the Secretary of the Navy
Filed Apr. 9, 1964, Ser. No. 358,674
6 Claims. (Cl. 74—433)

This invention relates generally to speed reduction drive apparatus and, more particularly, to an improved expansible, elliptical disk for adjusting the spacing between certain components of a harmonic drive unit.

A conventional harmonic drive unit includes a fixed, circular, internal gear and a flexible gear of lesser diameter meshing therewith at diametrically opposite points when flexed outwardly by a wave generator. The wave generator consists of an elliptical member which rotates within a flexible ball bearing arrangement and causes the flexible gear to be pushed or flexed outwardly along the major axis of the rotating ellipse. It is essential that any looseness or play between the disk, the inner bearing race, the balls, the outer bearing race, and the flexible gear be kept to a minimum, to reduce vibration, wear, and backlash.

According to the present invention, an expansible, elliptical disk, in which the major axis may be minutely varied, is provided for spreading the flexible ball bearing arrangement. The spreading of the ball bearings maintains the various parts of the unit in a tight relationship and minimizes looseness therebetween. As the major axis of the disk is increased, the flexible gear applies a compressive force in the region of the minor axis of the disk. The present invention, in addition, contemplates flexible fingers on the disk which act as springs to absorb the stresses exerted thereon by the flexible gear.

Accordingly, it is an object of the present invention to provide an expansible, elliptical disk for adjusting the spacing of various components of a harmonic drive unit.

Another object of the invention is to provide an expansible, elliptical disk for removing looseness between the parts of a harmonic drive unit which has a flexible construction at high stress areas.

Another object of the present invention is to provide an expansible, elliptical disk for minutely varying the major axis of the flexible, elliptical gear of a harmonic drive unit, thereby eliminating looseness between the various parts of the unit.

A further object of the present invention is to provide an expansible, elliptical disk for minutely varying the major axis of a flexible elliptical gear and for absorbing the stresses placed thereon by the gear.

Other objects and many of the attendant advantages of the present invention will be readily appreciated as the same becomes better understood by reference to the following detailed description when considered in connection with the accompanying drawings, wherein.

Figure 1:
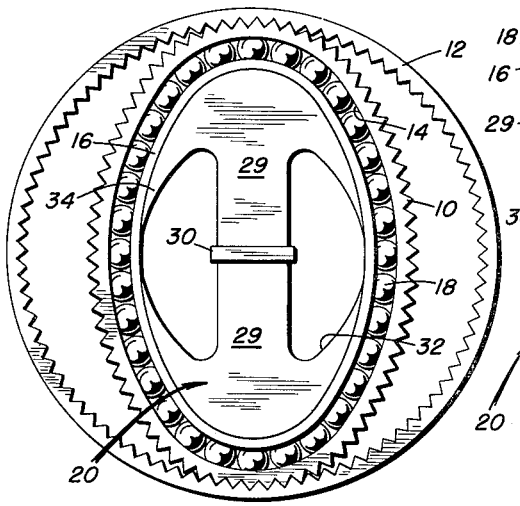
FIG. 1 is a front elevation of a harmonic drive unit having the disk of the present invention incorporated therein.
Figure 2:
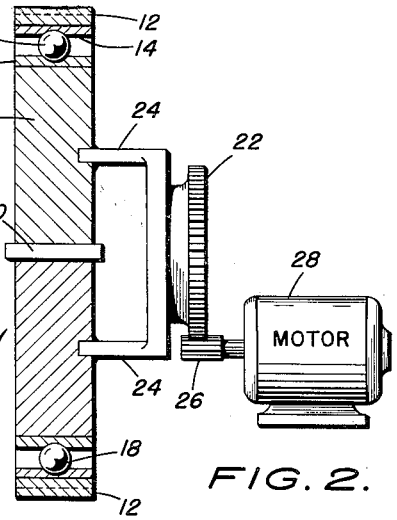
FIG. 2 is a side elevation, partially in section, of the unit shown in FIG. 1.

Referring to FIGS. 1 and 2, a flexible, elliptically shaped gear 10 is mounted within a fixed, circular, internal gear 12 which has fewer teeth than the gear 10. In contact with the inner surface of the gear 10 is a flexible outer bearing race 14. A flexible, inner bearing race 16 is spaced from the race 14, and a plurality of balls 18 are contained in the raceway. Fitted snugly within the inner race 16 is an elliptical disk 20 which has a gear 22 attached thereto by a pair of flexible arms 24. The disk 20 is adapted to be rotated by engagement of the gear 22 with a pinion 26 on the shaft of a motor 28.

As the disk 20 is rotated, the flexible, bearing races 14 and 16 assume the elliptical shape of the disk and cause the gear 10 to flex outwardly at two diametrically opposite points along the major axis of the disk. This flexing creates two traveling waves in the flexible gear 10, which gear is caused to mesh with the internal gear 12 at the crests of the waves. Because of the fewer number of teeth on the flexible gear 10 than on the internal gear 12, the gear 10 will have a slow rotating movement opposite to the direction of rotation of the disk 20.

To prevent any looseness between the disk 20, the ball bearing components, and the gears 10 and 12, the disk is formed of two identical segments 29, separated by a shim 30 and held together by the flexible arms 24. The arms 24 should be sufficiently rigid to hold the disk segments together as a unit during rotation, and yet should be sufficiently flexible to permit shims 30 of varying thicknesses to be inserted between the segments 29.

Each disk segment 29 is formed generally as one-half of an ellipse severed along its minor axis. Each disk segment contains a pair of cut out portions or recesses 32, forming a pair of tapering, flexible fingers 34 adjacent the minor axis of the elliptical disk 20. As the disk 20 rotates, the ball bearing races and the flexible gear 10 are flexed outwardly along the major axis of the elliptical disk, thereby causing the races and the gear to push inwardly against the sides of the disk. Much of the stresses created by this inward pushing will be absorbed by the fingers 34, due to their flexibility and tapered shape.

Figure 3:
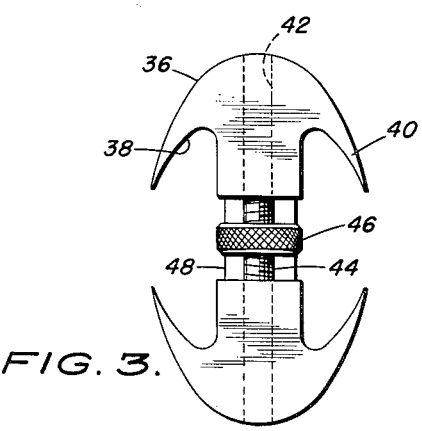
FIG. 3 is a front elevation of another embodiment of the expansible, elliptical disk which may be used with the harmonic drive unit of FIG. 1.
Figure 4:
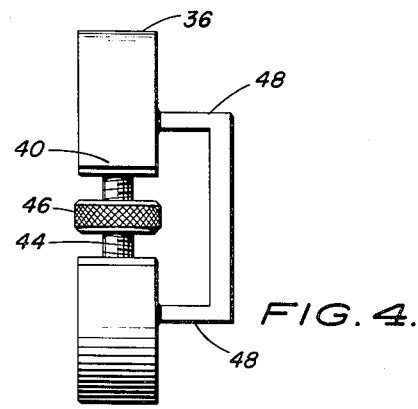
FIG. 4 is a side elevation of the disk shown in FIG. 3.

In order to take up the desired amount of looseness in a harmonic drive unit, an expansible, elliptical disk as shown in FIGS. 3 and 4 may also be used. This disk consists of two generally semi-elliptical segments 36, each having a pair of recesses 38 and pair of tapered flexible fingers 40, as described above in connection with the disk 20. Each of the segments 36 contains a threaded bore 42, the bores having different thread pitches. A differential screw 44 is threadedly engaged in both of the bores 42, the screw 44 having a knurled knob 46 at the midpoint thereof which separates the threads of different pitch. When the segments 36 are threaded on the differential screw 44, the screw will lie along the major axis of the ellipse formed by the segments. A pair of flexible arms 48 connects the segments 36 to hold them in spaced relation.

The disk is inserted within the inner bearing race of a harmonic drive unit in the same manner as the disk 20. The knob 46 is turned in the proper direction carrying with it the differential screw 44, causing the segments 36 to be separated a minute distance. The knob may be suitably calibrated so that the operator can determine exactly how much the segments have spread the harmonic drive elements. By selecting the proper thread pitches for the differential screw 44, adjustments of the major axis of the ellipse of the order of one ten-thousandth of an inch are possible. As the segments increase the major axis of the bearing races and the flexible gear, the constricting action of the races and flexible gear along the minor axis of the disk causes stressing forces to be applied thereto. These stresses will be absorbed by the tapered, flexible fingers 40. After the flexible gear has been expanded by the disk, the disk may be removed from the unit and be replaced by the disk 20. A shim 30 of proper thickness is then placed between the two segments 29 to retain the elliptical gear in its expanded configuration. If desired the expansible disk of FIG. 3 may also be used as a wave generator merely by providing the arms 48 with a gear, as shown in FIG. 2, so the arms may be rotated by the motor 28.

Figure 5:
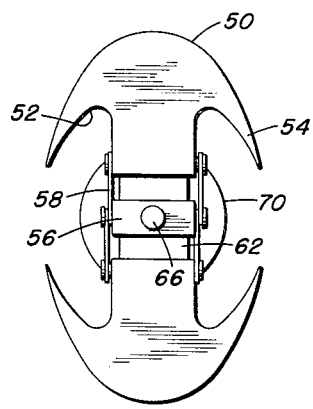
FIG. 5 is a front elevation of still another embodiment of the expansible, elliptical disk which may be used with the harmonic drive unit of FIG. 1.
Figure 6:
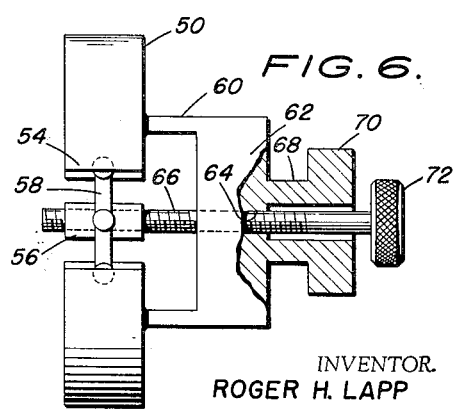
FIG. 6 is a side elevation, partially in section, of the disk shown in FIG. 5.

Referring to FIGS. 5 and 6, another embodiment of an expansible, elliptical disk is illustrated, which may be used to adjust the various parts of the harmonic wave unit of FIG. 1. The disk consists of a pair of spaced, semi-elliptical segments 50, each having a pair of recesses 52 and flexible fingers 54, as described in connection with the disk segments of FIGS. 1 and 3. A pair of toggle links 58 position the segments 50 in spaced elliptical relation, and support a threaded nut 56 in the space between the two segments 50. Each segment 50 is attached to a flexible arm 60 extending from a body 62. Provided in the body 62 is a threaded bore 64 aligned with the bore of the nut 56, but having threads of a different pitch than those of the nut. Threaded through both the bore 64 and the nut 56 is a differential screw 66, having an unthreaded portion extending beyond the body 62. A sleeve 68 integral with the body 62 extends concentrically of the screw 66 and terminates in a support ring 70. The screw 66 terminates in a knurled head or knob 72 outside the support ring 70.

The major axis of the disk is varied by turning the screw 66, causing the segments 50 to be separated a minute distance due to the combined action of the toggle links 58 and the differentially threaded bore 64 and nut 56. Finer adjustments are possible with this embodiment than with the previously described embodiments of FIGS. 1-4 because of this combined action. After any looseness has been removed from the unit, the disk is replaced by the disk 20 as described above in the discussion of the embodiment of FIGS. 3 and 4.

Obviously, many other modifications and variations of the present invention are possible in the light of the above teachings. It is therefore to be understood that within the scope of the appended claims the invention may be practiced otherwise than as specifically described.

What is claimed is:

1. In combination with a harmonic drive unit having an internal gear, a flexible, elliptical gear within the internal gear, and a ball bearing raceway within the elliptical gear; an expansible, elliptical disk comprising,
   two generally semi-elliptical disk segments, each segment having recesses therein forming tapered fingers,
   flexible means for holding said segments in spaced elliptical relation, and
   adjustable means for separating said segments a minute distance along the major axis of the ellipse to eliminate any looseness between the various parts of the unit.

2. The expansible, elliptical disk of claim 1, in which the adjustable means is a shim of a proper thickness.

3. The expansible, elliptical disk of claim 1, wherein the segments are provided with threaded bores, and wherein the adjustable means is a differentially threaded screw, said bores having different thread pitches, said screw having one of its ends contained within each of said bores, and means for turning said screw.

4. The expansible, elliptical disk of claim 1, in which said adjustable means is a pair of toggle links, one end of each link being affixed to one of said segments, and means for moving said toggle links.

5. In combination with a harmonic drive unit having an internal gear, a flexible, elliptical gear within the internal gear, and a ball bearing raceway within the elliptical gear; an expansible, elliptical disk comprising,
   two generally semi-elliptical disk segments, each segment having recessed portions to form tapered fingers,
   flexible means for holding said segments in spaced elliptical relation,
   a pair of toggle links, one end of each link being affixed to one of said segments and the other end of each link being affixed to the other segment,
   a nut having a threaded bore therethrough, said nut being attached to said links, and
   a threaded screw within the bore of said nut, whereby the rotation of said screw provides a toggle action and causes said segments to separate a minute distance along the major axis of the ellipse.

6. The expansible, elliptical disk of claim 5, further including a body integral with said flexible means, said body having a threaded bore therethrough which is aligned with the bore of said nut, the thread pitches within said body and said nut being different to provide a differential screw arrangement, whereby the combined action of the differential screw and the toggle links permits minute adjustment in the spacing of said segments.

References Cited by the Applicant
UNITED STATES PATENTS

| | | |
|---|---|---|
| 2,906,143 | 9/59 | Musser. |
| 2,931,249 | 4/60 | Musser. |
| 2,959,065 | 11/60 | Musser. |
| 3,005,358 | 10/61 | Musser. |
| 3,039,324 | 6/62 | Waterfield. |

DON A. WAITE, *Primary Examiner.*